United States Patent [19]

Bingham et al.

[11] 4,354,513
[45] Oct. 19, 1982

[54] CUTTINGS WASHER ASSEMBLY

[75] Inventors: Marion G. Bingham, Houston; Leonard D. Reagan, Spring, both of Tex.

[73] Assignee: Milchem Incorporated, Houston, Tex.

[21] Appl. No.: 216,230

[22] Filed: Dec. 15, 1980

[51] Int. Cl.³ .............................................. B08B 3/02
[52] U.S. Cl. ..................................... 134/104; 134/111
[58] Field of Search ...................... 134/104, 109, 111

[56] References Cited

U.S. PATENT DOCUMENTS

| | | | |
|---|---|---|---|
| 2,733,723 | 2/1956 | Whitcomb | 134/111 |
| 3,144,033 | 8/1964 | Stulberg et al. | 134/104 |
| 3,802,916 | 4/1974 | Jackson | 134/104 X |
| 3,860,019 | 1/1975 | Teague | 134/109 |
| 4,205,624 | 6/1980 | Yacus | 134/104 X |

Primary Examiner—Robert L. Bleutge
Attorney, Agent, or Firm—William C. Norvell, Jr.

[57] ABSTRACT

Particulate matter is deposited on an inclined vibrating screen. A spray of wash solution is directed onto the cuttings. As the cuttings move down the incline, the vibration agitates the wash solution and hydrocarbon contaminants from the cuttings. The solution is recovered below the screen. Washed cuttings are deposited onto a second inclined vibrating screen unit, where the procedure may be repeated. Recovered washing solution is cleaned and recirculated.

1 Claim, 2 Drawing Figures

CUTTINGS WASHER ASSEMBLY

CROSS-REFERENCE TO RELATED APPLICATION

This application is related in subject matter to copending application Ser. No. 216,227, filed Dec. 15, 1980, entitled "Cuttings Cleaning Method", said copending application being assigned to the same assignee as the present application.

BACKGROUND OF THE INVENTION

1. Field of the Invention

The invention relates to a cuttings washer method for use in drilling and similar operations for a subterranean well.

2. Description of the Prior Art

During the drilling of a subterranean well, a drilling fluid or mud is circulated within the well bore to cool and lubricate the drilling bit and to remove drilling cuttings from the bottom of the well. At the well head, the cuttings are removed, and the drilling fluid is recirculated. When an oil base drilling fluid is used, however, residual oil clinging to the cuttings may contaminate the environment, such as the ocean or sea, or the like. To avoid such contamination, and, in some situations, to comply with some government regulations, it is therefore desirable to wash such drilling cuttings before disposing of them, particularly from an offshore drilling rig.

Equipment for washing cuttings is commercially available. In known systems, cuttings are deposited in a tub containing a wash solution and are agitated therein. The cuttings are then deposited on a horizontal vibrating screen. Wash solution and oil contaminants are shaken off the cuttings particles and through the screen. The vibratory motions impel the cuttings particles off the edge of the screen into the ocean or other suitable depositary.

Depositing the cuttings in a washing tub, removing them after agitation, and depositing them on a shaker is relatively time consuming, hence in some drilling and related operations, even two of such systems operating at the same time have been unable to keep up with the drilling rate.

SUMMARY OF THE INVENTION

The disadvantages of the prior art are overcome with the method and apparatus of the present invention, in which drilling cuttings may be washed at least twice while traveling in a continuous path. Oil-contaminated cuttings are deposited on an inclined vibrating screen. A spray of washing solution which may include a surfactant, is directed upon such cuttings with sufficient force to effectively coat the cuttings with the solution. The vibratory motion moves the cuttings downwardly on the inclined screen and agitates the cuttings to remove the solution and oil contaminants through the screen. After traveling down the screen and being shaken to reduce the moisture content, i.e., the entire fluid content of the treated matter, to less than about ten percent, the cuttings fall off the lower edge of the screen onto another inclined, vibrating screen. Again the cuttings are sprayed and coated with a washing solution, and shaken to remove the washing solution and any remaining oil contaminants. Advantageously, the second and subsequent washing solutions may be more dilute then the first.

The washing solutions are recovered separately below each screen, and recirculated for reuse in spraying the cuttings. During recirculation, the wash solutions may be cleaned by a centrifuge, to remove any fine cuttings particles which have fallen through the screen.

DESCRIPTION OF THE PREFERRED EMBODIMENTS

In a typical drilling operation, drilling fluid which is circulated from the hole is separated from cuttings and particles it carries before being recirculated through the well bore. Solids control equipment, generally indicated at 10, for removing particles from the drilling fluid may comprise a desilter, a centrifuge, a cuttings shaker, and a mud cleaner. Before the removed particles are discarded oil or other hydrocarbons clinging to or otherwise associated with the particles is removed by the cuttings washer assembly.

The cuttings washer assembly comprises two inclined, vibrating shaker screens 12 and 14, nozzles 22 and 37 for spraying the cuttings with a washing solution, and recirculating and cleaning means for the washing solution.

Figure 1:
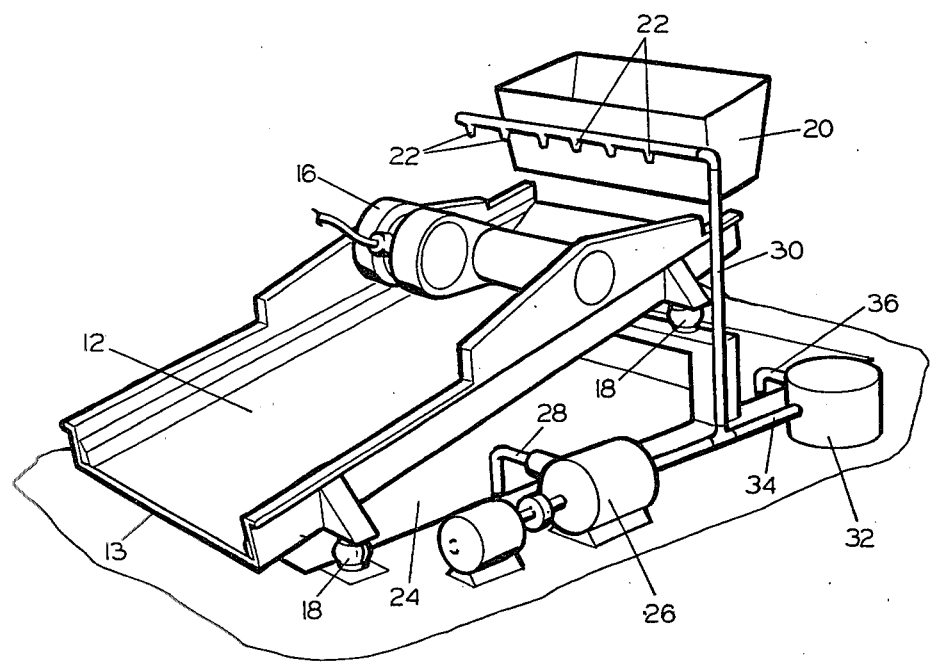
FIG. 1 is a perspective view of one of two series-operated vibrating screens used in the cuttings washer assembly.

The vibrating screens 12 and 14 are of the type disclosed in U.S. Pat. No. 3,014,587, to Philippovic. In general, as illustrated in FIG. 1, the inclined vibrating screen 12 is actuated by an unbalanced rotary motor 16 attached to the screen 12. The screen 12 may be secured to a supporting structure by means of hollow, elastomeric isolators 18. The isolators 18 may be pneumatically expanded to tune the apparatus to achieve the desired vibratory patterns. The apparatus may thus be tuned so that the vibrations toward the top of the inclined screen tend to retard the movement of particles down the incline, thus assuring adequate time for washing and screening. Alternatively, the screen 12 may be secured to the structure by means of coiled springs, solid shock absorbers, or the like. Towards the bottom of the incline the vibratory motions assist the movement of particles down the incline of the screen 12, to effectively pitch washed particles over the lower edge 13 of the screen 12.

Figure 2:
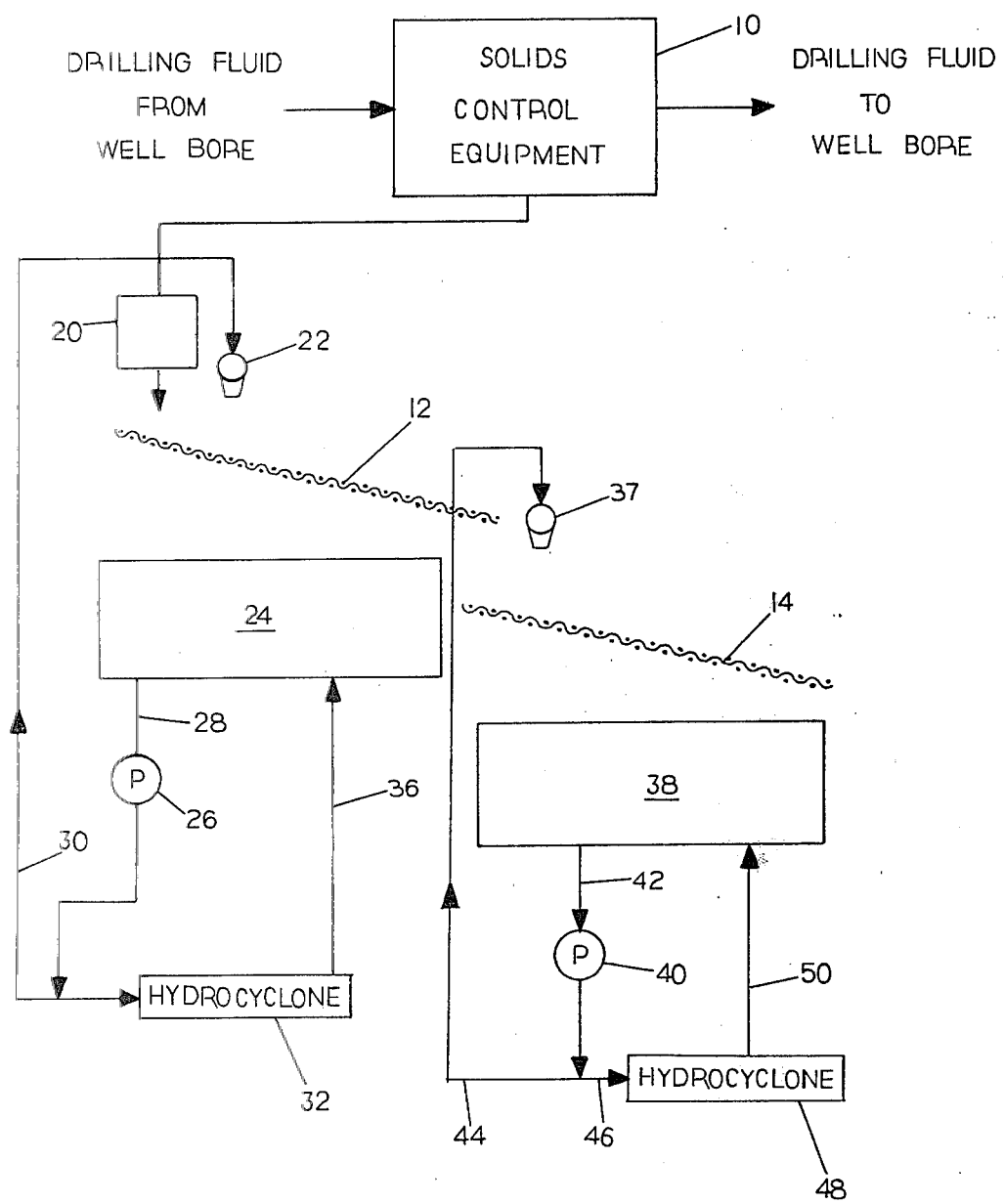
FIG. 2 is a schematic block diagram showing the operation of the cuttings washer assembly.

As illustrated in schematic form in FIG. 2, two of such vibrating screens are aligned in series. A chute 20 is disposed above the upper screen 12 for feeding particles from the solids control equipment 10 onto the upper portion of the vibrating screen 12. The screen 12 is disposed above the screen 14 and so arranged that the particles shaken off the lower edge 13 of the screen 12 fall onto the upper portion of the inclined screen 14. In an offshore drilling rig, the screen 14 may be so arranged that washed particles pitched off the lower edge of the screen 14 fall into the ocean.

Above the upper portion of the inclined screen 12, and adjacent the chute 20, are a plurality of suitably mounted spray nozzles 22, oriented to direct a forceful spray of washing solution onto cuttings particles deposited on the screen 12. The screen mesh is of a size that the cuttings paticles remain on top of the screen while the wash solution and rinsed off oil and other hydrocarbons pass freely though the screen. A tank 24 is disposed beneath the vibrating screen 12 to recover washing solution which passes through the screen 12. A pump 26 draws solution from the tank 24 through a line 28, and recirculates the washing solution through a line 30 to the spray nozzles 22. Some fine particles will inevitably pass through the screen 12 and into the wash solution in the tank 24. To avoid the necessity of frequent changing of the wash solution as it becomes contaminated with such fine drilled solids, a centrifuge or hydrocyclone 32 is provided. A portion of the output of the pump 26 is diverted through a line 34 to the hydrocarbon and/or centrifuge 32, and thence through a line 36 to the tank 24.

Similarly, a second set of nozzles 37 and a tank 38 are associated with the second inclined vibrating screen 14. A single pump could be employed to recirculate washing solution from tanks 24 and 38 through nozzles 22 and 36. However, two separate recirculation pumps may advantagously be employed, as illustrated schematically in FIG. 2. A second pump 40 withdraws water through a line 42 from the tank 38, and recirculates the wash solution through a line 44 to spray nozzles 37. A portion of the output of the pump 40 associated with the screen 14 is diverted through a line 46 through the hydrocyclone centrifuge 48 and thence through a line 50 to the tank 24. Thus two different wash solutions may advantageously be used. For example, the wash solution associated with the screen 12 may be a highly potent detergent solution, and the solution associated with the screen 14 may be a more dilute rinse solution.

To use the cuttings washer assembly, drilled cuttings particles separated from the drilling fluid by the solids control equipment 10 are deposited through the chute 20 onto the inclined vibrating screen 2, adjacent its upper edge. A high velocity spray of washing solution is directed onto the cuttings from the nozzles 22. Preferably, the nozzles 22 produce a cone shaped spray pattern which will distribute the wash solution throughout the deposited cuttings. The solution may typically comprise calcium chloride water and a surfactant, although other components and additives may be utilized. The spray must be introduced onto the cuttings with sufficient force and in sufficient amount to effectively remove hydrocarbon contaminants from the cuttings. The fluid pressure, flow rate, and nozzle configuration may be varied to achieve this result, in known ways.

The vibratory motion of the screen 12 propels the cuttings particles down the incline, and agitates the particles to remove oil and other hydrocarbons and wash solution from the particles. Satisfactory results are achieved when the particles are retained on the vibrating screen 12 until their moisture content is less than about ten percent, by weight. As the particles are exposed to the wash solution, a low moisture content indicates that hydrocarbon contaminants have also been substantially removed from the particles.

As the particles approach the lower edge 13 of the screen 12, the vibratory motion of the screen 12 pitches the particles onto the screen 14, adjacent the upper edge of the screen 14. Here the process of washing the particles with a spray of washing solution and agitating the particles to remove wash solution and hydrocarbons is repeated. Washed cuttings particles are propelled off of the lower edge of the screen 14 into the ocean, or may otherwise be disposed.

It should be noted that a single shaker with one longer, vibrating screen could be employed, while still using two sets of nozzles, and two separate wash solutions. With such an apparatus, it would merely be necessary to divide the screen into two separate treatment zones by placement of the two sets of nozzles and tanks. Again, the screen would have to be long enough to permit sufficient agitation under the spray to substantially coat all particles with wash solution and sufficient agitation beyond the spray to substantially reduce the moisture content. A screen length of about 12 feet would be appropriate in a single screen apparatus. Moreover, the screen assembly 12 itself may be subdivided into two or more screening units, in series.

The vibratory pattern of any particular area of the screen depends upon the distance of that area from the motor, the weight distribution of the screen assembly, the speed of the motor, and tuning of the screen insolators. As disclosed by the aforementioned Philippovic patent, the screen may be tuned to retard the downward motion of particles on the screen in some areas and to assist the flow of materials down the incline in other areas. However, as larger screens are employed, it becomes increasingly difficult to tune the system. To avoid unwanted vibrations that could impede the flow at the lower edge of a screen, it has been found preferable to use three or more shorter screens, in series, as described above.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are comtemplated which can be made without departing from the spirit of the described invention.

What is claimed and desired to be secured by Letters Patent is:

1. A cuttings washer assembly for removal of hydrocarbon contaminates from cuttings obtained from a fluid circulated from a subterranean well bore, comprising: a plurality of vibrating shakers, each of said shakers including an inclined vibrating screen adapted for retaining cuttings deposited thereon on the screen surface and permitting a wash fluid to pass therethrough; said shakers being arranged in series such that the second screen is arranged to receive said cuttings traveling off of a lower edge of the first screen; means at the upper end of the first screen for spraying a first wash liquid onto the cuttings deposited on the first screen; means at the upper end of the second screen for spraying a second wash liquid onto the cuttings deposited on the second screen; means for vibrating said screens to control the motion of said cuttings down the incline of said screens and subject the cuttings to sufficient vibration to dislodge wash fluid attached thereto; each of said screens having a total length adequate to reduce the moisture adhering to the cuttings reaching the lower end of the screen to a level less than about 10% by weight; and means for separately collecting said wash fluids for removal of particulate contaminates therefrom and recirculation to said screens for reuse.

* * * * *